United States Patent Office 3,681,303
Patented Aug. 1, 1972

3,681,303
SULFENAMIDES OF CARBODITHIOIC ACID CONTAINING AZABICYCLONONANE
John Joseph D'Amico, Dunbar, W. Va., assignor to Monsanto Company, St. Louis, Mo.
No Drawing. Division of application Ser. No. 701,569, Jan. 30, 1968, now Patent No. 3,590,030, which is a continuation-in-part of application Ser. No. 463,341, June 11, 1965, which is a continuation-in-part of application Ser. No. 426,348, Jan. 18, 1965. This application Sept. 21, 1970, Ser. No. 74,146
Int. Cl. C08f 27/06; C07d 41/04
U.S. Cl. 260—79.5 B
9 Claims

ABSTRACT OF THE DISCLOSURE

Compounds of the formula

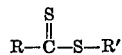

where R and R' are amino radicals of one to sixteen carbon atoms selected from the group consisting of alkylamino, dialkylamino, and heterocyclicamino, at least one of R and R' being 3-azabicyclo[3.2.2]non-3-yl, and their use for accelerating vulcanization of rubber are described.

---

This is a division of application Ser. No. 701,569, filed Jan. 30, 1968, now Pat. No. 3,590,030, which is a continuation-in-part of Ser. No. 463,341, filed June 11, 1965, now abandoned, which is a continuation-in-part of Ser. No. 426,348, filed Jan. 18, 1965.

The present invention relates to new compounds useful for accelerating the vulcanization of rubber.

The compounds of the present invention may be represented by the general formula:

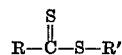

where R and R' are amino radicals containing one to sixteen carbon atoms, at least one of R and R' being azabicyclo[3.2.2]non-3-yl. The amino radicals comprise alkylamino, dialkylamino, and heterocyclicamino. Typical suitable examples of amino radicals are methylamino, ethylamino, propylamino, isopropylamino, butylamino, sec-butylamino, tert-butylamino, isobutylamino, amylamino, hexylamino, octylamino, nonylamino, decylamino, dodecylamino, dimethylamino, diethylamino, dipropylamino, diisopropylamino, dibutylamino, di-sec-butylamino, di-tert-butylamino, diisopropylamino, diamylamino, dihexylamino, dioctylamino, 1-pyrrolidinyl, piperidino, 5-ethyl-2-methylpiperidino, morpholino, 2,6 - dimethylmorpholino, 3-azabicyclo[3.2.2]non-3-yl, hexahydro - 1H - azepin-1-yl, hexahydro-2H-azocin-1-yl, and octahydro-1H-azonin-1-yl.

The preparation and properties of typical compounds are described in detail below.

EXAMPLE 1

Bis(3 - azabicyclo[3.2.2]non-3-ylthiocarbonyl) disulfide was required as a starting material in this example. A mixture of 25 grams (0.2 mole) of 3 - azabicyclo[3.2.2]nonane, 32 grams (0.2 mole) of 25% sodium hydroxide, and 500 ml. of water was prepared and 15.2 grams (0.2 mole) of carbon bisulfide added dropwise at 5°–15° C. After stirring the mixture at 25°–30° C. for an hour, the solution was cooled to 5° C. and 25.2 grams (0.11 mole) of $(NH_4)_2S_2O_8$ dissolved in 100 ml. of water added dropwise at 0°–10° C. in an hour. The reaction mixture was held at 0°–10° C. for an additional hour, the precipitate was then collected by filtration, washed with water until the washings were neutral to litmus, and air-dried at 25°–30° C. The product was obtained in 90% yield as a white solid melting at 174°–182° C. After recrystallization from dimethyl formamide, it melted at 183°–185° C.

A mixture of 100.2 grams of the bis(3-azabicyclo[3.2.2]non-3-ylthiocarbonyl) disulfide described above, 300 grams (3.0 mole, 300% excess) of hexamethylenimine, and 1000 ml. of isopropyl alcohol was stirred at 45°–50° C. for 2 hours. Thereupon, there was added dropwise at 45°–50° C. in 2 hours 0.375 mole of sodium hypochlorite (50% excess) in the form of 149.8 ml. of solution containing 18.69 grams hypochlorite per 100 ml. The stirred reaction mixture was held at 45°–50° C. for an additional hour and then heated to 75° C. over a 15-minute period and filtered at 75° C. to remove any sodium chloride or unreacted disulfide. To the cooled filtrate (10° C.) 4000 grams of ice-water containing 10 grams of sodium sulfite was added over a 10–15 minute period at 10°–15° C. The stirred mixture was maintained at 0°–10° C. for one hour. The precipitate was collected by filtration, sucked dry, then washed with water until the washings were neutral to litmus, and air-dried at 25°–30° C. Hexahydro-1H-azepin-1-yl 3-azabicyclo[3.2.2]-3-nonanecarbodithioate was obtained in 48.8% yield. After recrystallization from ethyl alcohol, it melted at 113°–114° C. Analysis gave 9.27% nitrogen and 21.54% sulfur compared to 9.39% nitrogen and 21.48% sulfur calculated for $$C_{15}H_{26}N_2S_2$$

EXAMPLE 2

A stirred mixture of 87.2 grams (0.25 mole) of bis(hexahydro-1H-azepin-1-ylthiocarbonyl) disulfide, 1000 ml. of isopropyl alcohol, and 125 grams (1.0 mole) of 3-azabicyclo[3.2.2]nonane was heated at 45°–50° C. for two hours. Thereupon, there was added dropwise at 45°–50° C., in two hours, 0.375 mole of sodium hypochlorite (50% excess) in the form of 173.5 ml. of solution containing 16.09 grams hypochlorite per 100 ml. The stirred reaction mixture was held at 45°–50° C. for an additional hour and then heated to 75° C. over a 15-minute period. The reaction mixture was filtered hot (75° C.) to remove any unreacted disulfide or sodium chloride. To the cooled filtrate (10° C.) 4000 grams of ice-water containing 10 grams of sodium sulfite were added slowly over a 10- to 15-minute period at 10°–15° C. The stirred reaction mixture was held at 0°–10° C. for one hour. The precipitate was collected by filtration, sucked dry, then washed with water until the washings were neutral to litmus, and air-dried at 25°–30° C. 3-azabicyclo[3.2.2] non-3-yl hexahydro-H-azepin - 1 - carbodithioate was obtained in 76% yield. After recrystallization from ethyl alcohol, the tan solid melted at 129°–131° C. Analysis gave 9.35% nitrogen and 21.17% sulfur compared to 9.39% nitrogen and 21.48% sulfur calculated for $C_{15}H_{26}N_2S_2$.

EXAMPLE 3

Substituting a chemically equivalent amount of bis(dimethylthiuram) disulfide for the disulfide in Example 2 and adding at 55°–60° C. in 2 hours 0.40 mole of sodium hypochlorite (60% excess) in the form of 149.8 ml. of solution containing 19.96 grams hypochlorite per 100 ml., 3-azabicyclo[3.2.2]non-3-yl dimethyldithiocarbamate was obtained in 93% yield. It was a white solid melting at 120°–121° C. after recrystallization from ethyl alcohol. Analysis gave 11.21% nitrogen and 25.86% sulfur compared to 11.46% nitrogen and 26.24% sulfur calculated for $C_{11}H_{20}N_2S_2$.

The following Examples 4 to 7 were prepared following the procedure of Example 2.

EXAMPLE 4

3-azabicyclo[3.2.2]non-3-yl 1-pyrrolidinylcarbodithioate from bis(1-pyrrolidinylthiocarbonyl) disulfide. It was obtained in 60.5% yield as an off-white solid melting at 122°–124° C. after recrystallization from ethyl alcohol. Analysis gave 10.26% nitrogen and 23.46% sulfur compared to 10.36% nitrogen and 23.71% sulfur calculated for $C_{13}H_{22}N_2S_2$.

EXAMPLE 5

3 - azabicyclo[3.2.2]non-3-yl morpholinocarbodithioate from bis(3-oxapentamethylene thiuram) disulfide. It was obtained in 94.5% yield as an off-white solid melting at 93°–95° C. after recrystallization from heptane. Analysis gave 9.40% nitrogen and 21.90% sulfur compared to 9.78% nitrogen and 22.39% sulfur calculated for $C_{13}H_{22}N_2OS_2$.

EXAMPLE 6

3-azabicyclo[3.2.2]non-3-yl hexahydro-1(2H)-azocinecarbodithioate from bis(hexahydro-1(2H)-azocinylthiocarbonyl) disulfide. It was obtained in 73.6% yield as a cream solid melting at 103°–104° C. after recrystallization from ethyl alcohol. Analysis gave 8.62% nitrogen and 21.14% sulfur compared to 8.96% nitrogen and 20.52% sulfur calculated for $C_{16}H_{28}N_2S_2$.

EXAMPLE 7

3-azabicyclo[3.2.2]non-3-yl octahydro - 1H - azonine-1-carbodithioate from bis(octahydro - 1H - azonin-1-ylthiocarbonyl) disulfide. It was obtained in 39.2% yield as a cream solid melting at 108°–109° C. after recrystallization from alcohol. Analysis gave 8.53% nitrogen and 19.00% sulfur compared to 8.58% nitrogen and 19.64% sulfur calculated for $C_{17}H_{30}N_2S_2$.

EXAMPLE 8

A mixture of 100.2 grams (0.25 mole) of bis(3-azabicyclo[3.2.2]non-3-ylthiocarbonyl) disulfide prepared as described in the first paragraph of Example 1, 219.6 grams (3.0 moles) of tert-butylamine, and 1000 ml. of isopropyl alcohol was stirred at 45°–50° C. for 2 hours. Thereupon, there was added dropwise at 45°–50° C. in 2 hours 0.375 mole of sodium hypochlorite (50% excess) in the form of 154.5 ml. of solution containing 18.07 grams hypochlorite per 100 ml. The stirred reaction mixture was held at 45°–50° C. for an additional hour and then heated to 75° C. over a 15-minute period. The reaction mixture was filtered at 75° C. in order to remove any unreacted disulfide or sodium chloride. To the cooled filtrate (10° C.), 4000 grams of ice water containing 10 grams of sodium sulfite was added slowly over a 10- to 15-minute period at 10°–15° C. The stirred reaction mixture was maintained at 0°–10° C. for one hour. The precipitate was collected by filtration, sucked dry, then washed with water until the washings were neutral to litmus and air-dried at 25°–30° C. Tert-butylamino-3-azobicyclo[3.2.2]-3-nonanecarbodithioate was obtained in 43% yield. The light tan solid melted at 84°–85° C. after recrystallization from ethyl alcohol. Analysis gave 10.18% nitrogen and 23.72% sulfur compared to 10.28% nitrogen and 23.54% sulfur calculated for $C_{13}H_{24}N_2S_2$.

The following Examples 9 to 12 were prepared following the procedure of Example 8, replacing tert-butylamine by the appropriate amine.

EXAMPLE 9

1-pyrrolidinyl 3-azabicyclo[3.2.2]-3-nonanecarbodithioate from pyrrolidine. It was obtained in 78.2% yield as a pale yellow solid melting at 123°–124° C. after recrystallization from ethyl alcohol. Analysis gave 10.17% nitrogen and 23.11% sulfur compared to 10.36% nitrogen and 23.79% sulfur calculated for $C_{13}H_{22}N_2S_2$.

EXAMPLE 10

Piperidino 3-azabicyclo[3.2.2]-3-nonanecarbodithioate from piperidine. It was obtained in 63.4% yield as a cream solid melting at 120°–121° C. after recrystallization from heptane. Analysis gave 9.63% nitrogen and 22.21% sulfur compared to 9.85% nitrogen and 22.54% sulfur calculated for $C_{14}H_{24}N_2S_2$.

EXAMPLE 11

Morpholino 3 - azabicyclo[3.2.2]-3-nonanecarbodithioate from morpholine. It was obtained in 36.3% yield as a white solid melting at 116°–117° C. after recrystallization from ethyl alcohol. Analysis gave 9.54% nitrogen compared to 9.78% calculated for $C_{13}H_{22}N_2OS_2$.

EXAMPLE 12

Dimethylamino 3 - azabicyclo[3.2.2]-3-nonanecarbodithioate from 60% dimethylamine. It was obtained in 42.6% yield as an off-white solid melting at 89° C. after recrystallization from ethyl alcohol. Analysis gave 11.15% nitrogen and 26.15% sulfur compared to 11.46% nitrogen and 26.24% sulfur calculated for $C_{11}H_{20}N_2S_2$.

EXAMPLE 13

To a stirred solution containing 21.3 grams (0.25 mole) of piperidine, 100 ml. of water, 200 ml. of isopropyl alcohol, and 40 grams (0.25 mole) of 25% aqueous sodium hydroxide, 19 grams (0.25 mole) of carbon disulfide was added dropwise at 10°–20° C. The reaction mixture was stirred at 25°–30° C. for one hour and then heated to 40° C. To the resulting solution was added 125 grams (1.0 mole, 300% excess) of 3-azabicyclo[3.2.2]nonane and the stirred reaction mixture heated at 40°–45° C. for 20 minutes. To this stirred reaction mixture at 45° C. was added dropwise in 1.5 hours 63.5 grams (0.25 mole) of iodine dissolved in a solution of 62.5 grams of potassium iodide in 500 ml. of water. During this addition the temperature fell slowly to 38° C. The reaction mixture was added to 4000 grams of water and stirred at 25°–30° C. for 2 hours. The solids were collected by filtration, washed with water until the washings were neutral to litmus, and air-dried at 25°–30° C. 3-azabicyclo[3.2.2]non-3-ylpiperidinecarbodithioate was obtained in 99% yield as a tan solid. After recrystallization from ethyl alcohol is melted at 111°–112° C. Analysis gave 9.86% nitrogen compared to 9.85% calculated for $C_{14}H_{24}N_2S_2$.

EXAMPLE 14

Substituting 3-azabicyclo[3.2.2]nonane in equimolar amount for the piperidine in Example 13 produced the desired product (92 grams, M.P. 152°–154° C.) in admixture with a small amount of bis(3-azabicyclo[3.2.2]non-3-ylthiocarbonyl) disulfide. The product was recrystallized from ethyl alcohol to yield 41 grams (50.8% yield) of 3-azabicyclo[3.2.2]non - 3 - yl 3-azabicyclo[3.2.2]-3-nonanecarbodithioate as a tan solid melting at 177°–178° C. Analysis gave 8.69% nitrogen and 19.18% sulfur compared to 8.63% nitrogen and 19.77% sulfur calculated for $C_{17}H_{28}N_2S_2$.

As a specific embodiment of the invention illustrating accelerating properties, a rubber base composition was compounded comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |

To the base stock was added 0.5 part of accelerator and the composition cured by heating in a press for various periods of time at 144° C. The modulus and tensile properties of the optimum cures are set forth below:

TABLE I

| Accelerator | Modulus | Tensile |
|---|---|---|
| Tert-butylamino 3-azabicyclo[3.2.]-3-nonanecarbodithioate | 3,850 | 3,800 |
| Dimethylamino 3-azabicyclo[3.2.2]-3-nonanecarbodithioate | 3,130 | 4,000 |
| 1-pyrrolidinyl 3-azabicyclo[3.2.2]-3-nonanecarbodithioate | 3,170 | 3,900 |
| Piperidine 3-azabicyclo[3.2.2]-3-nonanecarbodithioate | 3,230 | 3,800 |
| Hexahydro-1H-azepin-1-yl 3-azabicyclo[3.2.2]-3-nonanecarbodithioate | 3,000 | 4,100 |
| Morpholino 3-azabicyclo[3.2.2]-3-nonanecarbodithioate | 2,840 | 4,000 |
| 3-azabicyclo[3.2.2]non-3-yl dimethyldithiocarbamate | 3,380 | 3,900 |
| 3-azabicyclo[3.2.2]non-3-yl 1-pyrrolidinylcarbodithioate | 3,270 | 3,900 |
| 3-azabicyclo[3.2.2]non-3-yl hexahydro-1H-azepine-1-carbodithioate | 3,090 | 3,600 |
| 3-azabicyclo[3.2.2]non-3-yl morpholinocarbodithioate | 2,950 | 3,900 |
| 3-azabicyclo[3.2.2]non-3-yl piperidinocarbodithioate | 3,080 | 3,900 |
| 3-azabicyclo[3.2.2]non-3-yl hexahydro-1(2H)-azocine carbodithioate | 2,940 | 3,800 |
| 3-azabicyclo[3.2.2]non-3-yl octahydro-1H-azonine-1-carbodithioate | 3,060 | 4,000 |
| 3-azabicyclo[3.2.2]non-3-yl 3-azabicyclo[3.2.2]-3-nonanecarbodithioate | 3,080 | 3,800 |

As illustrative of accelerating activity in a synthetic rubber stock, butadiene-styrene copolymer rubber was blended in a standard formula as follows:

| | Parts by weight |
|---|---|
| SB-R 1500 | 100 |
| Carbon black | 50 |
| Zinc oxide | 4 |
| Stearic acid | 2 |
| Saturated hydrocarbon softener | 10 |
| Sulfur | 1.75 |

Tests were carried out employing the compounds on an equimolar basis. To the above there was added in separate stocks accelerator as follows:

| Accelerator | Parts by weight | Stock |
|---|---|---|
| Product of Example 1 | 1.79 | A |
| Product of Example 2 | 1.79 | B |
| Product of Example 3 | 1.47 | C |
| Product of Example 4 | 1.62 | D |
| Product of Example 5 | 1.72 | E |
| Product of Example 6 | 1.88 | F |
| Product of Example 7 | 1.96 | G |
| Product of Example 8 | 1.64 | H |
| Product of Example 9 | 1.62 | J |
| Product of Example 10 | 1.71 | K |
| Product of Example 11 | 1.72 | L |
| Product of Example 12 | 1.47 | M |
| Product of Example 13 | 1.71 | N |
| Product of Example 14 | 2.00 | O |

The stocks were cured in the usual manner by heating in a press for various periods of time at 153° C. The physical properties of the 25- and 50-minute cures are set forth below:

TABLE II

| Stock | Cure time in minutes | Modulus in lbs./in.² at 300% elong. | Tensile at break in lbs./in.² |
|---|---|---|---|
| A | 25 | 2,680 | 3,400 |
| | 50 | 2,900 | 3,500 |
| B | 25 | 2,570 | 3,400 |
| | 50 | 2,830 | 3,300 |
| C | 25 | 2,550 | 3,500 |
| | 50 | 2,750 | 3,700 |
| D | 25 | 2,850 | 3,400 |
| | 50 | 2,980 | 3,500 |
| E | 25 | 2,450 | 3,700 |
| | 50 | 2,590 | 3,700 |
| F | 25 | 2,490 | 3,100 |
| | 50 | 2,740 | 3,300 |
| G | 25 | 2,450 | 3,600 |
| | 50 | 2,750 | 3,700 |
| H | 25 | 2,160 | 3,580 |
| | 50 | 2,600 | 3,590 |
| J | 25 | 2,850 | 3,600 |
| | 50 | 2,950 | 3,800 |
| K | 25 | 2,550 | 3,300 |
| | 50 | 2,850 | 3,600 |
| L | 25 | 2,280 | 3,780 |
| | 50 | 2,640 | 3,700 |
| M | 25 | 2,720 | 3,500 |
| | 50 | 2,790 | 3,800 |
| N | 25 | 2,340 | 3,700 |
| | 50 | 2,560 | 3,800 |
| O | 25 | | 2,400 |
| | 50 | | 1,900 |

The data set forth above indicate that the products of the present invention possess activity as vulcanization accelerators. They accelerate vulcanization of any sulfur-vulcanizable diene rubber. This class of rubbers contains a diene hydrocarbon in the polymer structure which contributes unsaturation and sulfur vulcanizability. They include styrene-butadiene copolymer rubbers, polybutadiene, natural rubber, and synthetic polyisoprene. For most purposes the accelerators of this invention will be used in amounts within the range of 0.1–5.0% of the rubber.

It is intended to cover all changes and modifications of the examples of the invention herein chosen for purposes of disclosure which do not constitute departures from the spirit and scope of the invention. The matter contains in each of the following claims is to be read as part of the general description of the present invention.

I claim:

1. A process of accelerating the vulcanization of rubber which comprises heating sulfur-vulcanizable diene rubber and sulfur with a compound of the formula

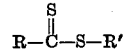

where R and R' are amine radicals of one to sixteen carbon atoms selected from the group consisting of alkylamine, dialkyl amine, and heterocyclicamino, at least one of R and R' being 3-azabicyclo[3.2.2]non-3-yl.

2. A process according to claim 1 wherein one of R and R' is

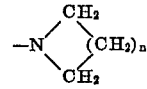

where $n$ is an integer at least two but less than seven.

3. A process according to claim 2 where $n$ is three or four.

4. A process according to claim 1 wherein one of R and R' is dimethylamino.

5. A process according to claim 1 wherein R' is tert-butylamino.

6. A process according to claim 1 wherein one of R and R' is morpholino.

7. A process according to claim 1 wherein R is hexahydro-1H-azepin-1-yl.

8. A process according to claim 1 wherein R' is hexahydro-1H-azepin-1-yl.

9. A process according to claim 1 wherein R is octahydro-1H-azonin-1-yl.

References Cited

UNITED STATES PATENTS

| 2,333,468 | 11/1943 | Cooper | 260—793 |
| 2,381,392 | 8/1945 | Smith, Jr. | 260—793 |
| 2,581,936 | 1/1952 | Carr | 260—306.6 |

JOSEPH L. SCHOFER, Primary Examiner

C. A. HENDERSON, Jr., Assistant Examiner

U.S. Cl. X.R.

260—239 BA, 784, 792